(12) United States Patent
Glass

(10) Patent No.: US 9,573,608 B2
(45) Date of Patent: Feb. 21, 2017

(54) TORCH CART

(71) Applicant: Billy L. Glass, Waverly, OH (US)

(72) Inventor: Billy L. Glass, Waverly, OH (US)

(73) Assignee: Balt Designs, LLC, Waverly, OH (US)

( * ) Notice: Subject to any disclaimer, the term of this patent is extended or adjusted under 35 U.S.C. 154(b) by 0 days.

(21) Appl. No.: 14/712,355

(22) Filed: May 14, 2015

(65) Prior Publication Data
US 2015/0329133 A1   Nov. 19, 2015

Related U.S. Application Data

(60) Provisional application No. 61/993,416, filed on May 15, 2014.

(51) Int. Cl.
| B62B 1/08 | (2006.01) |
| B62B 1/14 | (2006.01) |
| B62B 1/26 | (2006.01) |
| F23Q 1/06 | (2006.01) |
| F23Q 1/02 | (2006.01) |

(52) U.S. Cl.
CPC ............... B62B 1/14 (2013.01); B62B 1/26 (2013.01); B62B 1/264 (2013.01); F23Q 1/02 (2013.01); F23Q 1/06 (2013.01)

(58) Field of Classification Search
CPC .. B62B 1/264; B62B 1/14; B62B 1/00; B62B 1/06; B62B 1/186; B62B 1/12; B62B 3/00; B62B 3/02; B62B 3/04; B62B 3/12; B62B 3/104; B62B 2202/02; B62B 2202/022; F23Q 1/06; F23Q 1/00; F23Q 1/02; F23Q 1/04
See application file for complete search history.

(56) References Cited

U.S. PATENT DOCUMENTS

| 1,244,030 | A | * | 10/1917 | Cave | 239/71 |
| 4,231,734 | A | * | 11/1980 | Burns | 431/274 |
| 4,253,716 | A | * | 3/1981 | Turner, Jr. | 312/100 |
| 4,432,470 | A | * | 2/1984 | Sopha | B01J 4/008 |
| | | | | | 222/135 |
| 4,486,044 | A | * | 12/1984 | Gordon | F17C 13/084 |
| | | | | | 220/630 |
| 4,573,665 | A | * | 3/1986 | Strohl et al. | 266/48 |
| 4,625,949 | A | | 12/1986 | Walker | |
| 4,932,394 | A | * | 6/1990 | Nanaumi | A61B 1/0052 |
| | | | | | 600/148 |
| 5,078,415 | A | * | 1/1992 | Goral | 280/79.2 |
| 5,307,839 | A | | 5/1994 | Loebker et al. | |
| 6,109,544 | A | * | 8/2000 | Sheng | 239/195 |
| 6,116,623 | A | | 9/2000 | Salvucci | |
| 6,334,622 | B1 | * | 1/2002 | Romero | 280/47.26 |
| 6,930,282 | B1 | | 8/2005 | Di Novo et al. | |
| 7,122,147 | B2 | * | 10/2006 | Wakeman et al. | 266/48 |
| 7,252,297 | B1 | * | 8/2007 | Barritt et al. | 280/47.26 |
| 7,438,084 | B2 | * | 10/2008 | Trettin et al. | 137/355.16 |
| 8,167,322 | B2 | * | 5/2012 | Greene | 280/47.26 |

(Continued)

*Primary Examiner* — James M Dolak
(74) *Attorney, Agent, or Firm* — Fay Sharpe LLP

(57) ABSTRACT

A torch cart includes a base for supporting first and second storage tanks, a wall provided between the tanks for separating the tanks, a container for housing a torch, a pair of holsters for holding a pair of fire extinguishers, and a hands-free striker mounted to the cart for igniting the torch. The hands-free striker has a tip and a friction pad for passing a torch tip over and igniting the torch.

11 Claims, 7 Drawing Sheets

(56) References Cited

U.S. PATENT DOCUMENTS

| | | | | |
|---|---|---|---|---|
| 8,398,097 B2* | 3/2013 | Junk | ........................ | B08B 3/026 |
| | | | | 123/195 R |
| 8,809,741 B2* | 8/2014 | Feldhausen | ............ | B23K 9/013 |
| | | | | 219/137.9 |
| 8,895,895 B2* | 11/2014 | Feldhausen | ............ | B23K 9/013 |
| | | | | 219/130.1 |
| 8,937,265 B2* | 1/2015 | Feldhausen | ............ | B23K 9/013 |
| | | | | 219/130.1 |
| 8,937,266 B2* | 1/2015 | Feldhausen | ............ | B23K 9/013 |
| | | | | 219/130.1 |
| 8,967,634 B2* | 3/2015 | Barnes et al. | ............. | 280/47.29 |
| 9,254,856 B2* | 2/2016 | Oachs | .................... | B62B 3/005 |
| 9,266,545 B2* | 2/2016 | Robinson | .................. | B62B 1/26 |
| 9,302,688 B2* | 4/2016 | Reddi | .................... | B62B 1/002 |
| 2004/0245680 A1 | 12/2004 | Wakeman et al. | | |
| 2005/0168002 A1* | 8/2005 | Herring | .................... | B23K 9/32 |
| | | | | 294/146 |
| 2008/0230669 A1* | 9/2008 | Brady | ....................... | 248/346.03 |
| 2009/0282707 A1* | 11/2009 | Shenouda | ............... | E01H 5/106 |
| | | | | 37/227 |
| 2016/0107271 A1* | 4/2016 | Stewart | ............. | B23K 37/0294 |
| | | | | 280/402 |

* cited by examiner

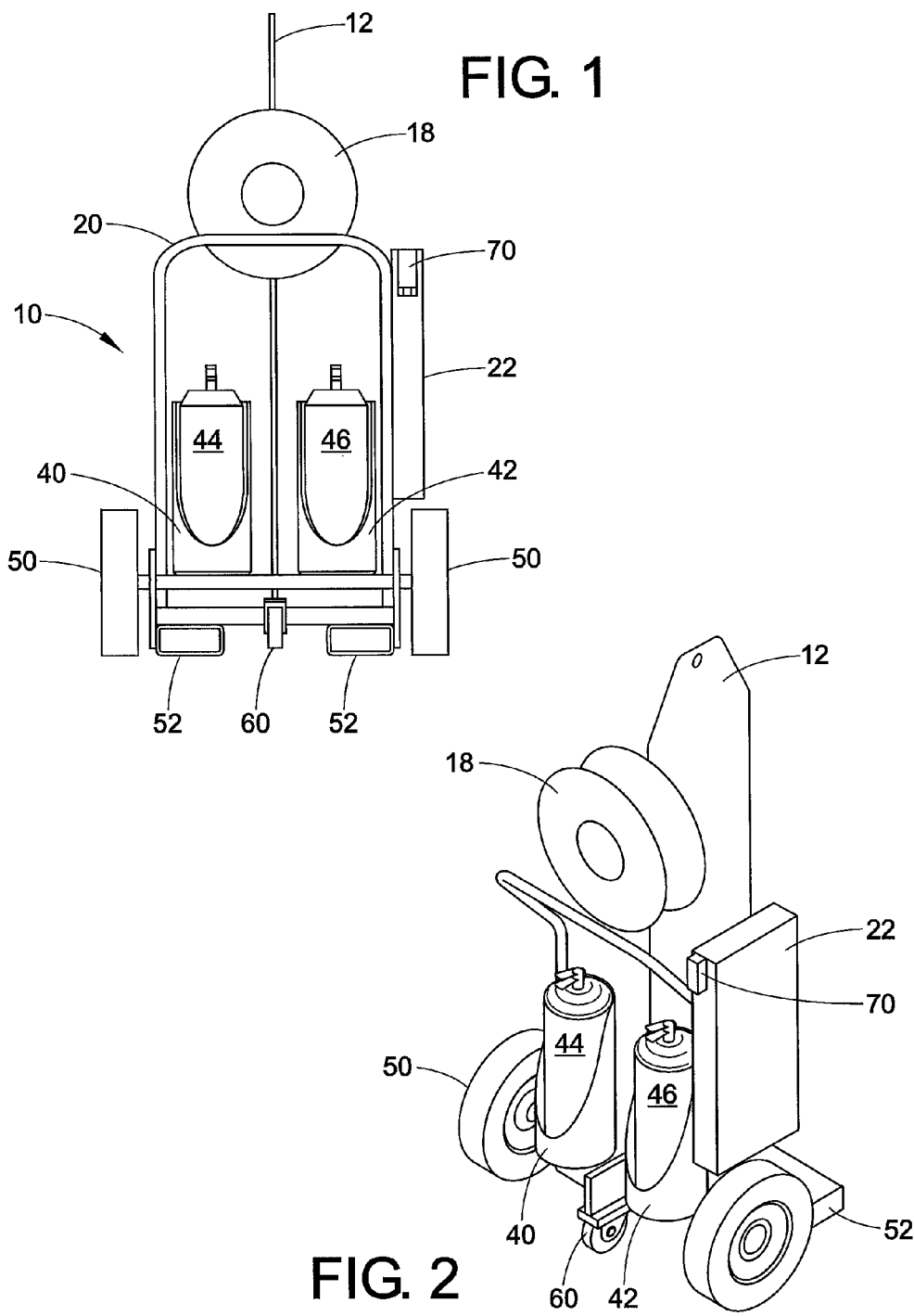

TORCH CART

CLAIM OF PRIORITY

This application claims priority to provisional patent application Ser. No. 61/993,416 filed on May 15, 2014, which is incorporated by reference herein.

BACKGROUND OF THE DISCLOSURE

The disclosure relates to torch carts. More specifically, it relates to an improved torch cart for storing and transporting pressurized liquid or gas storage tanks and related equipment.

Tanks for storing and dispensing pressurized gas and/or liquid, such as oxygen and acetylene or propane tanks are commonly used in a wide variety of industrial, medical and other applications. A typical storage tank comprises a hollow cylinder made of steel or other rigid impermeable material that stores the gas or liquid under relatively high pressure. A valve assembly is in fluid flow communication with the tank and may include a regulator to control the flow of fluid from the tank and a gauge to monitor the fluid level and/or pressure. A supply hose is connected to the output port of the valve assembly for dispensing the fluid.

Often storage tanks are used in an environment where the fluid stored in the tank is used in conjunction with other equipment for performing a particular function. Example environments are welding and electrical work where a tank storing liquid fuel such as acetylene or propane is used along with a tank storing oxygen.

Such applications also require other related equipment and accessories such as brazing rods, pipe fittings, solder, flux, hand tools, torch heads or the like. Because the typical filled storage tanks are heavy and difficult to transport and a wide variety of related equipment may be required at the work site, it is difficult and cumbersome for a worker to easily and conveniently transport the tanks and related accessories and equipment from one work site to another.

Some existing torch carts are provided with a separate torch igniter which must be hand-held to ignite the torch. There is a need to provide a hands-free striker which can be provided with the torch cart to enable the user to easily light or ignite the torch while keeping their hands free for holding the torch, etc.

Thus, an improved torch cart for use with pressurized tanks which allows for storage of oxygen and acetylene or propane tanks in combination with other related components is desired.

SUMMARY OF THE DISCLOSURE

The present disclosure relates to a torch cart. More specifically, it relates to an improved torch cart design which facilitates storage of several storage tanks and related equipment. The disclosure relates to a compact torch cart apparatus which brings together a unique combination of features in one torch cart which is not available in existing carts. Such features include essential tools used or required by welders or other industrial workers which come together to provide a versatile work station. The main components which are included with the torch cart include but are not limited to: a) a fire barrier, b) a hose reel, c) a base unit, d) a lockable storage box, e) fire extinguishers, f) flat free tires, g) fork truck pockets, h) third support wheel, and i) a hands-free mechanical striker.

The combination of these components located on a single torch cart is believed to be particularly unique, including three components on the back of the torch cart (the fire extinguishers, hose reel, and third support wheel) combined with the lockable storage box, front fork truck pockets, and the hands-free mechanical striker. Such a torch cart assembly will save set-up and breakdown time and reduce time needed to transport and use the equipment, thus increasing time efficiency, reducing costs, decreasing the risk of safety violations, and securely storing valuable tools.

Thus, one embodiment of the disclosure is a torch cart design which has a combination of features. Another aspect of the disclosure is the torch design effectively combines essential tools used or required by welders or other industrial workers at job sites around the world.

Another embodiment of the disclosure is a torch cart including a base for supporting first and second storage tanks; a wall provided between the tanks for separating the tanks; a container for housing a torch; at least one holster for holding at least one fire extinguisher; and a hands-free striker mounted to the cart for igniting the torch.

Another embodiment of the disclosure is a hands-free striker assembly for use with a torch cart, including a hands-free striker mounted to the torch cart for igniting a torch attached to the torch cart; wherein the hands-free striker includes a mounting body mounted to the torch cart having a striker tip for lighting the torch; and wherein the hands-free striker further includes a friction pad for lighting the torch by passing the torch over the friction pad and into contact with the striker tip.

Still another embodiment of the disclosure is the collection of tools efficiently located on one mobile cart which saves hours of set up and breakdown time, decreases risk of safety violations associated with fire preparedness and securely stores valuable tools, all while providing a compact, highly versatile work station.

Still other embodiments of the disclosure will be apparent upon a reading and understanding of the following detailed disclosure.

BRIEF DESCRIPTION OF THE DRAWINGS

Embodiments of the present disclosure are described with reference to the following figures:

FIG. 1 is a front elevational view of a torch cart in accordance with a preferred embodiment of the disclosure;

FIG. 2 is a front perspective view of the torch cart of FIG. 1;

DETAILED DESCRIPTION OF THE DISCLOSURE

Figure 3:
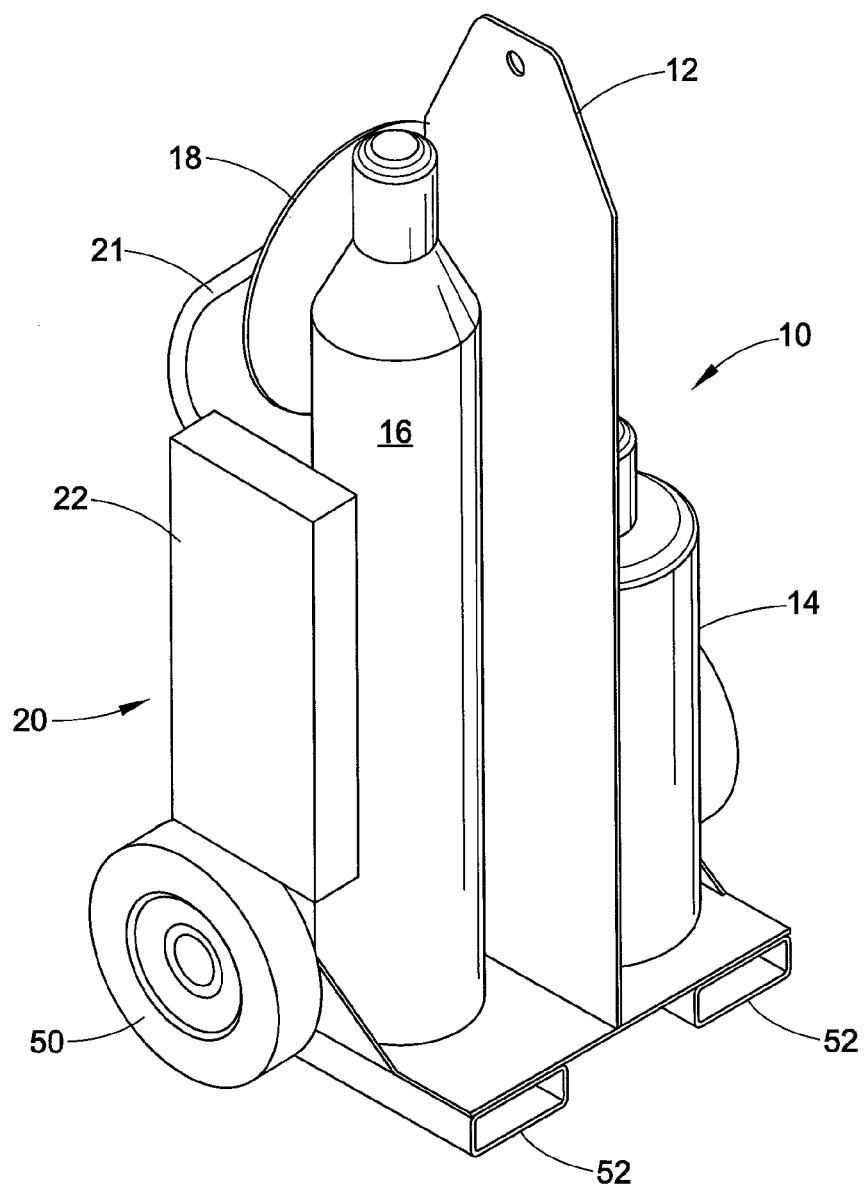
FIG. 3 is another front perspective view of the torch cart of FIG. 1.

The present disclosure relates to a torch cart. More specifically, it relates to an improved torch cart design which facilitates storage of several storage tanks and related equipment. The disclosure relates to a compact torch cart apparatus which brings together a unique combination of features in one torch cart not provided in existing carts. Such features include essential tools used or required by welders or other industrial workers which come together to provide a versatile work station. The main components which are included with the torch cart include but are not limited to: a) a fire barrier, b) a hose reel, c) a base unit, d) a lockable storage box, e) fire extinguishers, f) flat free tires, g) fork truck pockets, h) third support wheel, and i) a hands-free mechanical striker.

The combination of these components located on a single torch cart is unique, including three components on the back of the torch cart (the fire extinguishers, hose reel, and third support wheel) combined with the lockable storage box, front fork truck pockets, and the hands-free mechanical striker. Such a torch cart assembly will increase efficient use by reducing set-up and breakdown time and reduce time needed to transport and use the equipment, thus increasing time efficiency, reducing costs, decreasing the risk of safety violations, and securely storing valuable tools.

Referring now to FIGS. 1-8, a torch cart 10 in accordance with a preferred embodiment of the disclosure is shown. Specifically, referring to FIGS. 2 and 3, torch cart 10 has a metal fire barrier or wall 12 such as made of steel which is positioned between and designed to separate oxygen tanks 14 and acetylene tanks 16 thereby bringing the cart into compliance with OSHA, UFC, CGA and NFPA safety standards. The firewall 12 facilitates the storage of fuel and oxygen cylinders together and in a side by side fashion in an efficient and safe manner that complies with OSHA standard 1910.253(b)(4)(iii) and NFPA 55-7.1.6.2.1. Oxygen tanks 16 can hold up to 122 cf to 330 cf of oxygen. Acetylene tanks 14 preferably can hold #3, #4, #4M or #5 tanks. The numbers refer to the size of tanks. For example, #4 refers to a height 39.5 inches, eight of 73 pounds and a normal volume of 140 cubic feet.

Figure 4:
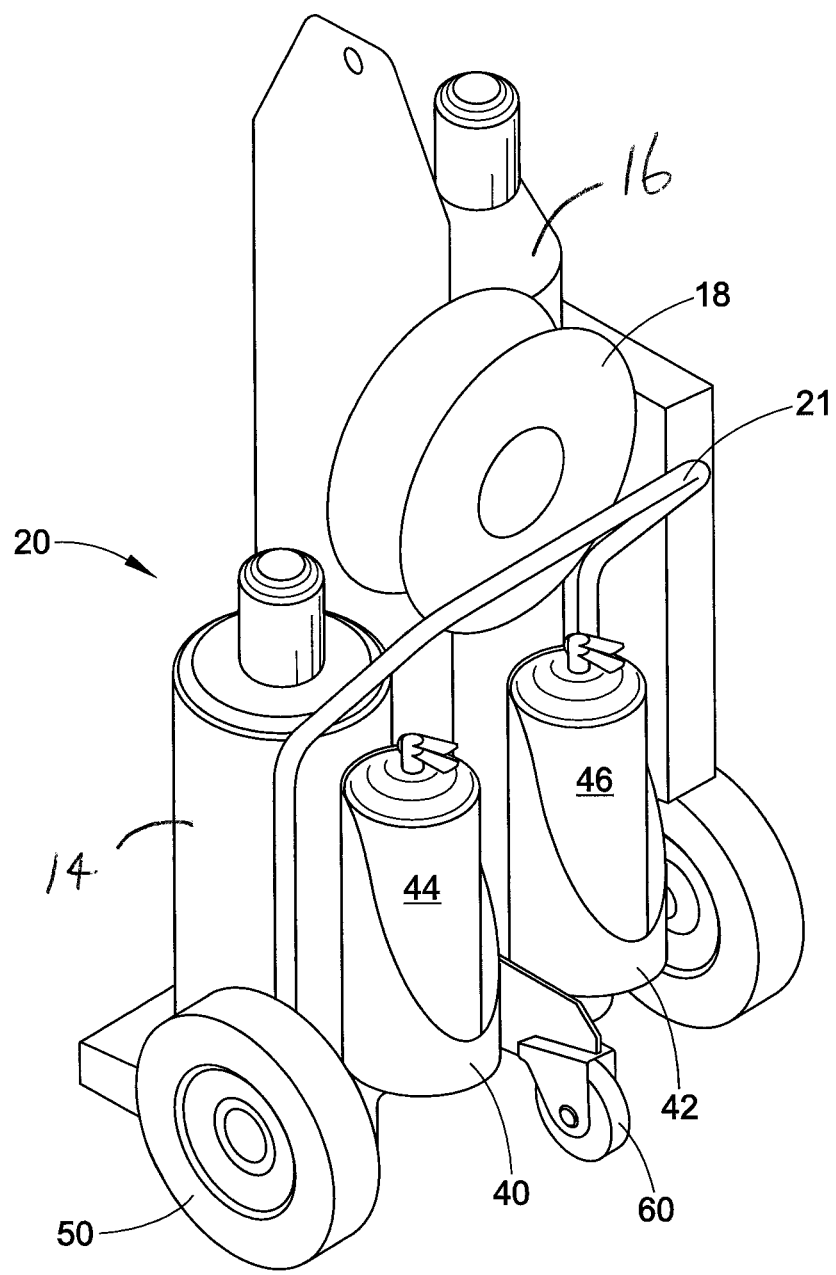
FIG. 4 is a rear perspective view of the torch cart of FIG. 1.
Figure 5:
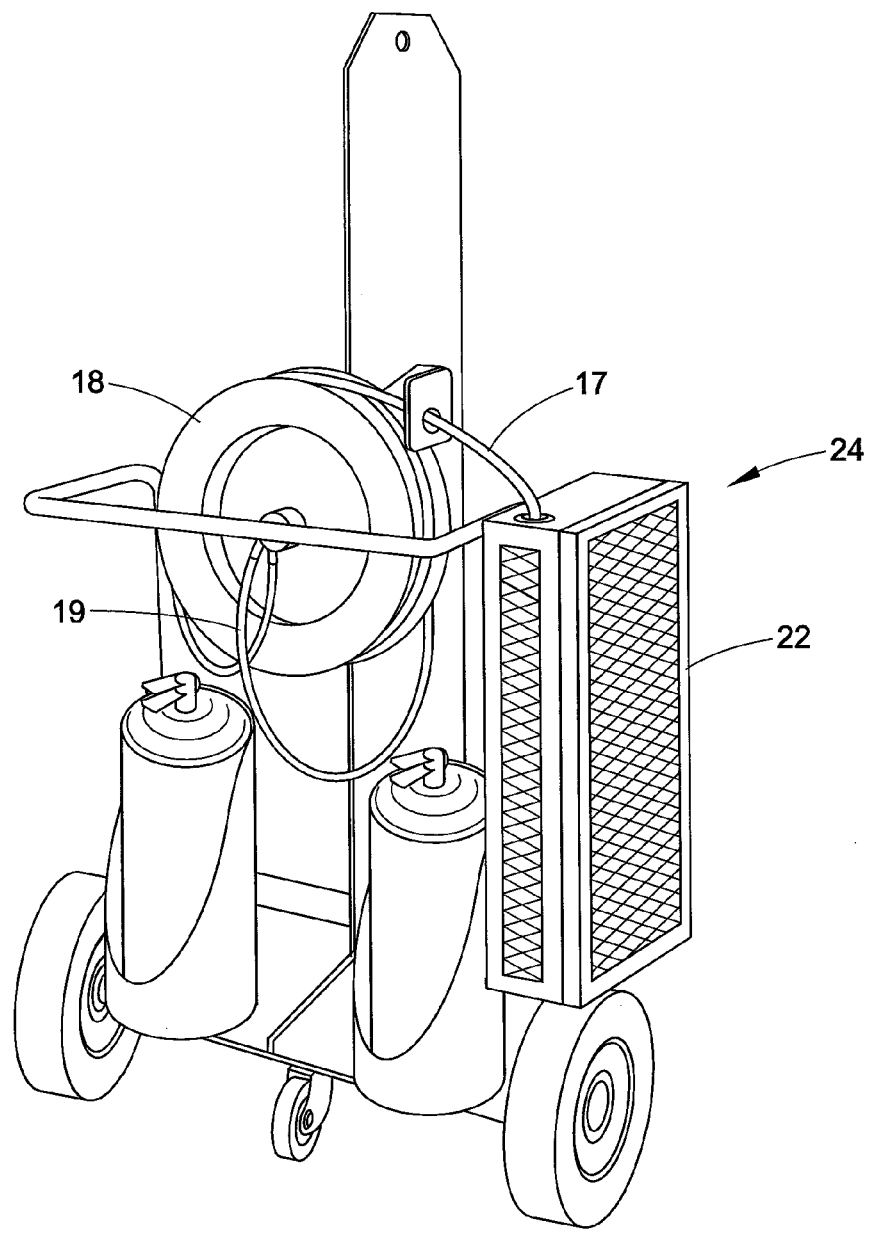
FIG. 5 is another rear perspective view of the torch cart of FIG. 1.

Referring to FIGS. 2, 4, and 5, the torch cart is also equipped with a hose reel 18 having retractable dual hoses 17, 19 which may be acquired from a third party and mounted to the cart. Hoses 17, 19 can be connected to one of the oxygen tanks 16 and acetylene tank 14 and to a torch 30.

Referring to FIGS. 1, 2, 3, and 4, base unit 20 is the body or housing of the cart to which all of the components are mounted. The base 20 has an ergonomic handle 21 mounted on a rear portion of the cart to facilitate moving the cart.

Figure 6:
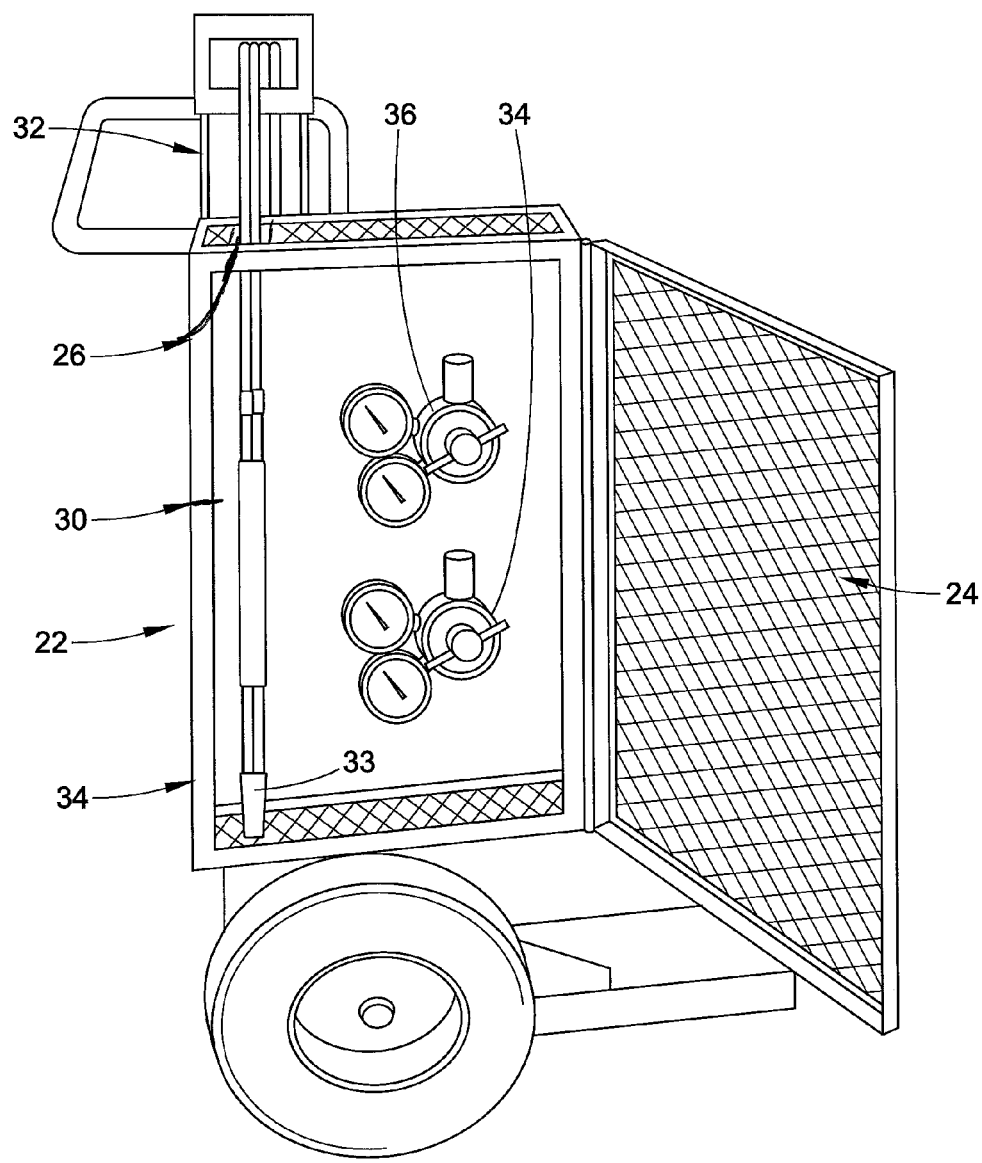
FIG. 6 is a side view of the storage box of the torch cart of FIG. 1 in an opened configuration.

Referring to FIGS. 3, 5, and 6, a lockable storage box 22 is preferably constructed of mesh steel 24 and features a slot 26 which allows operator to secure torch 30 in the box without the need to disconnect it from hose 17. Hangers 34 for gauges 36 are located on the inside of the box 22.

Referring to FIGS. 1, 2, and 4, attached to the rear base of the torch cart are two holsters 40, 42 for holding and storing two fire extinguishers 44, 46. The fire extinguishers 44, 46 are provided to be in compliance with OSHA standard 1926.352(d). Fire extinguisher 44 is a water fire extinguisher while fire extinguisher 46 is an ABC fire extinguisher. For example, an ABC fire extinguisher is classified by fire type. "A" stands for trash, wood, paper, "B" is for liquids and "C" is for electrical equipment.

Referring to FIGS. 1, 2, and 3, another aspect of the disclosure is flat free tires 50 which are provided which minimize the downtime required to replace the tires.

Referring to FIGS. 1 and 3, fork truck pockets 52 are attached to the base unit 44, 46 as two tube steel pockets that are designed to accommodate a fork truck for lifting and transporting the cart.

Referring to FIGS. 1, 2, and 4, a third wheel 60 in the form of a support wheel is located on the back side of the cart and is designed to allow one person to tilt a loaded cart onto its wheels without danger of over-tipping.

Figure 7:
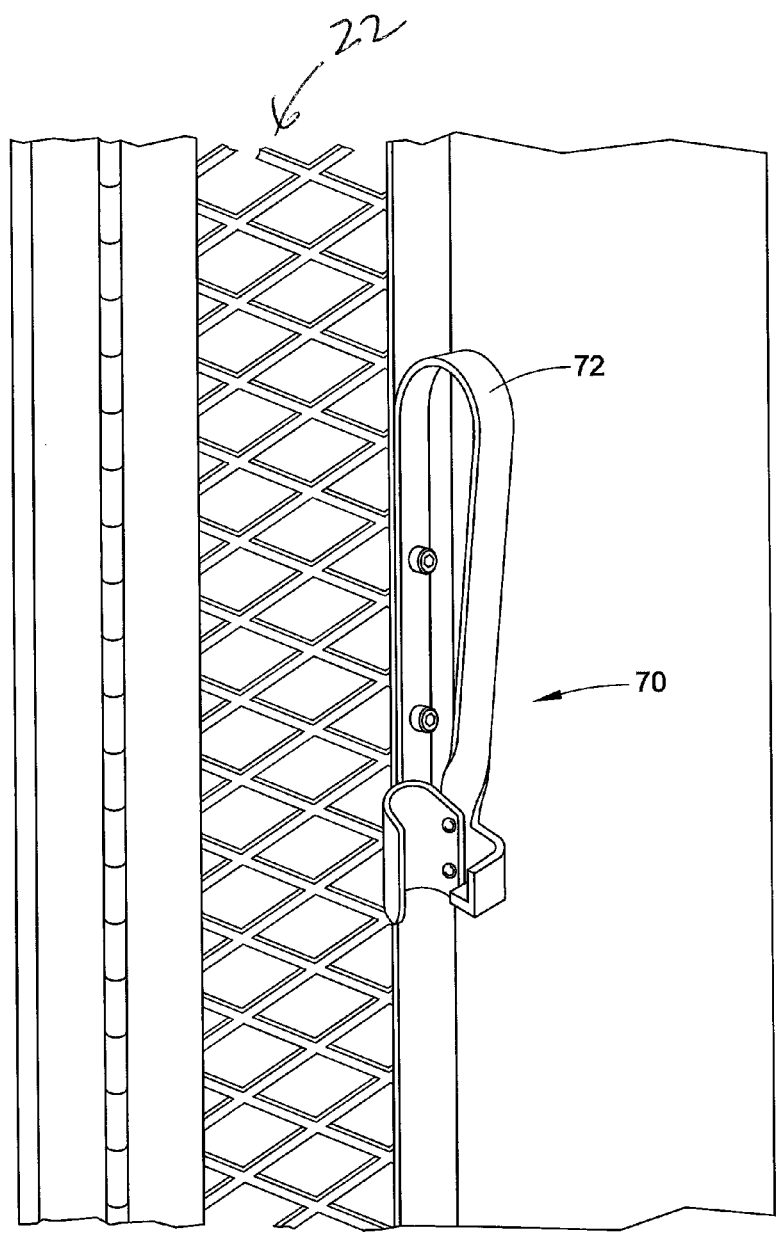
FIG. 7 is a side perspective view of a hands-free striker.
Figure 8:
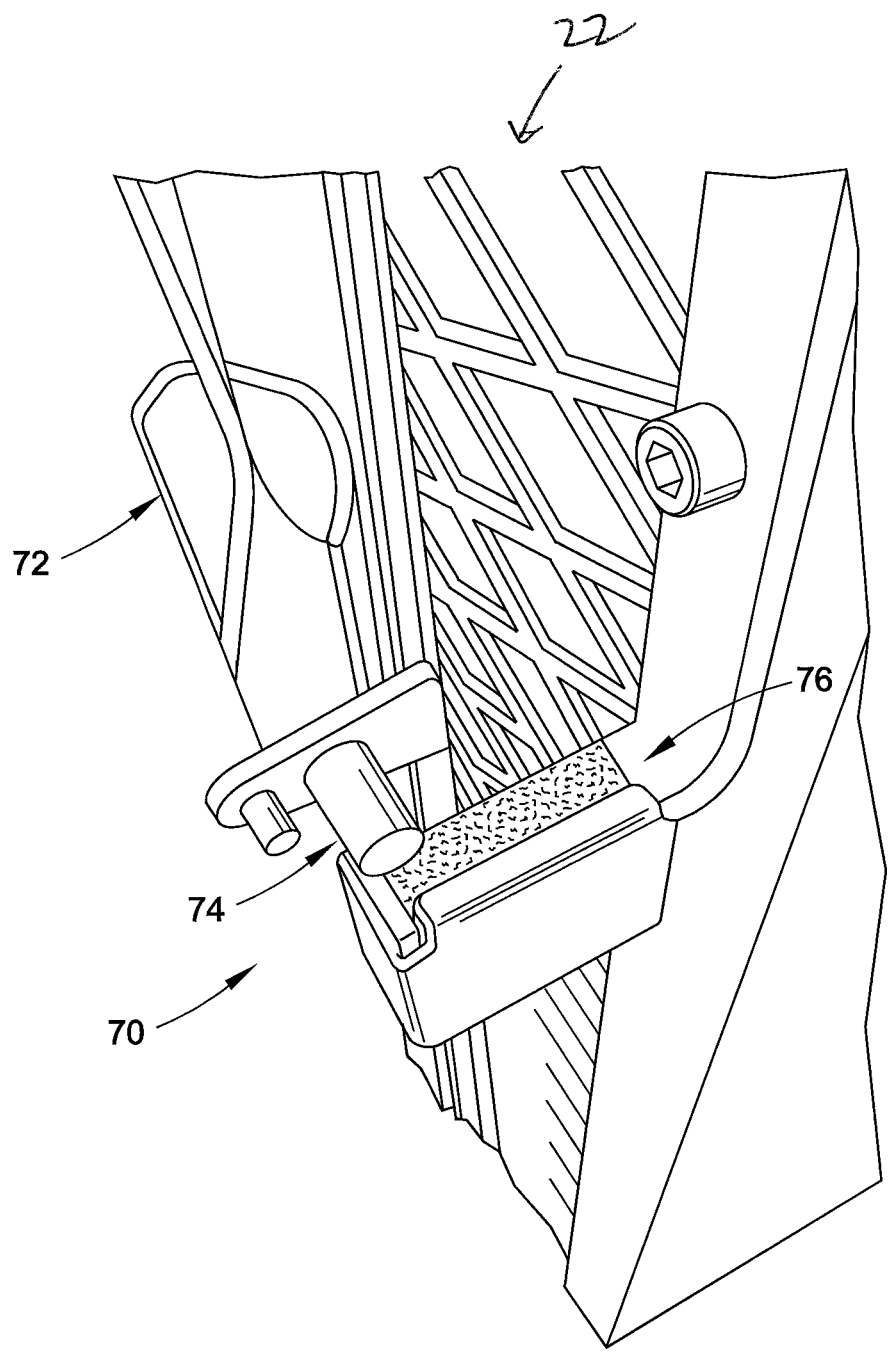
FIG. 8 is another side perspective view of the striker.

In accordance with another aspect of the disclosure, referring now to FIGS. 7 and 8, a mechanical striker 70 in the form of a mechanical hands-free striker is mounted directly to the cart on storage box 22 and allows the worker to ignite the wand of the torch 30 by inserting a tip 33 of the torch wand 35 into the device activating the striker and igniting the torch. The striker includes a body 72 which is preferably formed of bent metal and is bolted or otherwise mounted to the cart storage box. The striker tip 74 is positioned within the body and ignites the torch by inserting the tip of the torch wand. The striker 74 is specifically configured for lighting a torch wand against a friction pad 76. Specifically, the torch tip 33 passes over the friction pad 76 and is ignited at tip 74 of the striker. The striker can be used with other configurations of torch carts and is not limited to this cart. Also, the striker can be provided separately and mounted on the cart at the worksite, or can be provided on a separate cart or apparatus independent of the torch cart.

The exemplary embodiment has been described with reference to the preferred embodiments. Obviously, modifications and alterations will occur to others upon reading and understanding the preceding detailed description. It is intended that the exemplary embodiment and appended claims be construed as including all such modifications and alterations.

The invention claimed is:

1. A torch cart comprising:
   a base supporting first and second storage tanks wherein said base comprises pocket openings for accommodating associated lifts of a fork truck for lifting said torch cart;
   a wall provided between said first and second storage tanks wherein said wall separates said first and second storage tanks;
   a container housing a torch, said container comprising a mesh and a slot for retaining said torch;
   at least one holster holding at least one fire extinguisher; and
   a hands-free striker mounted to said cart wherein said striker lights said torch;
   wherein said hands-free striker comprises a body fixedly mounted to said cart and having a striker tip attached to said body wherein said striker tip lights said torch without moving said striker; and a support wheel mounted to a rear portion of said torch cart to prevent tipping of said torch cart.

2. The torch cart of claim 1, further comprising:
   an ergonomic handle attached to said base for moving said torch cart.

3. The torch cart of claim 1, further comprising a reel holding at least one hose for connecting to one of said first and second storage tanks.

4. The torch art of claim 1, further comprising flat free tires rotatably secured to said base for moving said torch cart.

5. The torch cart of claim 1, wherein said first storage tank comprises an oxygen tank and said second storage tank comprises an acetylene tank.

6. The torch cart of claim 5, wherein said oxygen tank holds up to 339cf of oxygen.

7. The torch cart of claim 3, wherein said at least one hose comprises a first and second hose for connecting to one of said first and second storage tanks.

8. The torch cart of claim 1, wherein said wall is a fire barrier wall made of metal.

9. The torch cart of claim 1, wherein said at least one holster comprises a first holster and a second holster and said at least one fire extinguisher comprises a first fire extinguisher and a second fire extinguisher.

10. The torch cart of claim 9, wherein said first fire extinguisher comprises a water fire extinguisher and said second fire extinguisher comprises an ABC fire extinguisher.

11. The torch cart of claim 1, wherein said hands-free striker further comprises a friction pad for lighting said torch.

\* \* \* \* \*